United States Patent
Frueh et al.

(10) Patent No.: US 12,528,710 B2
(45) Date of Patent: Jan. 20, 2026

(54) METHOD FOR PREPARING HIGH PURITY ALUMINUM MONOHYDRATE AND ALPHA ALUMINA

(71) Applicant: Almatis GmbH, Ludwigshafen (DE)

(72) Inventors: Tobias Frueh, Ludwigshafen (DE); Marius Schustereder, Ludwigshafen (DE); Wolfram J. Lingenberg, Ludwigshafen (DE)

(73) Assignee: Almatis GmbH, Ludwigshafen (DE)

( * ) Notice: Subject to any disclaimer, the term of this patent is extended or adjusted under 35 U.S.C. 154(b) by 36 days.

(21) Appl. No.: 17/906,090

(22) PCT Filed: Mar. 12, 2021

(86) PCT No.: PCT/EP2021/056339
§ 371 (c)(1),
(2) Date: Sep. 12, 2022

(87) PCT Pub. No.: WO2021/180924
PCT Pub. Date: Sep. 16, 2021

(65) Prior Publication Data
US 2025/0128956 A1    Apr. 24, 2025

(30) Foreign Application Priority Data
Mar. 13, 2020 (EP) .................... 20162967

(51) Int. Cl.
*C01F 7/447* (2022.01)
*C01F 7/441* (2022.01)

(52) U.S. Cl.
CPC ............ *C01F 7/447* (2013.01); *C01F 7/441* (2013.01); *C01P 2006/80* (2013.01)

(58) Field of Classification Search
CPC .......... C01F 7/447; C01F 7/441; C01F 7/448; C01P 2006/80; Y02E 60/10
See application file for complete search history.

(56) References Cited

U.S. PATENT DOCUMENTS 6,403,007 B1 *   6/2002   Kido ........................ B01J 21/04
                                                                    264/234
2012/0189833 A1 *  7/2012   Suchanek ............... C04B 35/80
                                                                    501/153

FOREIGN PATENT DOCUMENTS

| CN | 109420529 B | 3/2019 |
| EP | 0885844 A1 | 12/1998 |
| EP | 1840085 A2 | 10/2007 |

(Continued)

OTHER PUBLICATIONS

International Search Report and the Written Opinion of the International Searching Authority corresponding to International Patent Application No. PCT/EP2021/056339 (9 pages) (mailed May 26, 2021).

Primary Examiner — Daniel Berns
Assistant Examiner — Joshua Maxwell Speer
(74) Attorney, Agent, or Firm — Myers Bigel, P.A.

(57) ABSTRACT

The present invention concerns a method of preparing aluminum monohydrate comprising the steps of i) mixing alumina feedstock with ethylenediamine tetraacetic acid, to obtain a feedstock mixture, and ii) subjecting the feedstock mixture to a hydrothermal treatment, wherein the wherein the pH of the feedstock mixture is at least 8. The resulting aluminum monohydrate, although starting from low purity feedstocks, shows an excellent purity and can be calcined to obtain high purity alpha alumina.

19 Claims, 2 Drawing Sheets

(56) References Cited

FOREIGN PATENT DOCUMENTS

EP        2030950   A1    3/2009
EP        3599221   A1    1/2020

\* cited by examiner

METHOD FOR PREPARING HIGH PURITY ALUMINUM MONOHYDRATE AND ALPHA ALUMINA

Brief Description of the Drawings

FIG. 3 is a diagram showing the impurity concentration ($Na_2O$, $Fe_2O_3$, and CaO) as a function of the pH value. The present invention concerns a method for preparing high purity aluminum monohydrate (such as boehmite and/or diaspore), and high purity alpha alumina, from low purity alumina feedstock using a hydrothermal treatment. Further described is the use of a complexing agent.

The preparation of boehmite using hydrothermal treatment is known in the art. EP 0 304 721 B1 discloses a method of making a microcrystalline boehmite product which comprises heating under autogenous pressure a precursor compound that is hydrothermally convertible to boehmite in an aqueous medium having a pH of 5 or less or of 8 or higher and in the presence of boehmite seed particles finer than 0.02 μm. As the precursor aluminum oxide, aluminum hydroxide or an aluminum alkoxide can be used. After hydrothermal treatment, microcrystalline boehmite is obtained. CN 110357135 A teaches a method for preparing alumina for lithium battery separators using aluminum hydroxide and ultrafine aluminum hydroxide seed crystals and mixing these with ammonia. However, both methods are technically complicated and require high amounts of expensive seed particles.

In view of the prior art, it is an object underlying the present invention to provide a less expensive, easy controllable method of preparing aluminum monohydrate with high purity using a low purity (impure) and, therefore, less expensive, feedstock and a minimum amount of technical equipment. It is a further object of the present invention to provide a specific use of a complexing agent.

The solution to the above captioned problem is described in the independent claims. The dependent claims contain advantageous embodiments of the present invention.

Accordingly, the above-captioned object is solved by a method of preparing aluminum monohydrate, such as boehmite and/or diaspore, comprising the steps of mixing alumina feedstock with a complexing agent selected from nitrogen-containing complexing agents, acetic acid and citric acid, to obtain a feedstock mixture and subjecting the feedstock mixture to a hydrothermal treatment. It was surprisingly found that due to the addition of the specific complexing agent to an alumina feedstock prior to hydrothermal treatment the purity of the prepared aluminum monohydrate can be improved significantly.

Thus, an important first aspect of the present invention is directed to a method of preparing aluminum monohydrate comprising the steps of:

mixing an alumina feedstock with ethylenediamine tetraacetic acid, to obtain a feedstock mixture, and
subjecting the feedstock mixture to a hydrothermal treatment,
wherein the pH of the feedstock mixture is at least 8.

In the prior art it was not recognized that, in a simple and efficient method, a (low purity) feedstock can be used to prepare aluminum monohydrate (or alpha alumina upon calcination of the aluminum monohydrate) having a high purity, wherein ethylenediamine tetraacetic acid is used in the feedstock mixture subjected to a hydrothermal treatment, and the pH of the feedstock mixture is at least 8.

In particular, when using an alumina feedstock having a purity of 99.8% or less, particularly a purity of 99.6% or less, the purity of the aluminum monohydrate after carrying out the inventive method is at least 99.90% and preferably up to 99.99%. Typical impurities, which can be contained in the alumina feedstock and which can be removed by the inventive method include $Na_2O$, CaO, $Fe_2O_3$, ZnO, $Li_2O$, MnO, CuO, $Ga_2O_3$ and BeO. Such impurities are often occluded in the particles and agglomerates of the alumina feedstock. Within the present invention, an alumina feedstock having a purity of 99.8% or less, in particular a purity of 99.6% or less, is a "low purity" alumina feedstock. In a preferred embodiment of the invention, in order to be able to compare the purity of the feedstock before treatment (e.g. smelter grade alumina or aluminum hydrate) with the aluminum monohydrate product obtained by the method as described herein, all purity values are reported on an $Al_2O_3$ basis.

By the step of "mixing an alumina feedstock with ethylenediamine tetraacetic acid, to obtain a feedstock mixture", thus, a feedstock mixture is prepared which contains the alumina feedstock as well as the ethylenediamine tetraacetic acid, and optionally other ingredients as evident from the disclosure herein. The pH of the feedstock mixture (i.e. before subjecting it to the hydrothermal treatment) is at least 8.

During hydrothermal treatment, which is typically carried out in an autoclave under pressure and elevated temperature, the alumina feedstock undergoes recrystallization to form thermodynamically more stable phases. It was observed that using the inventive complexing agent(s), the impurities become available for removal by complexation and optionally dissolution during hydrothermal treatment and can therefore be separated easily by filtration, washing and drying of the obtained product after finishing the hydrothermal treatment and cooling of the reaction mixture, whereby high purity aluminum monohydrate having a purity of at least 99.90% is obtained. The high purity aluminum monohydrate can finally be dried.

The inventive method does not require specific additional method steps but merely requires the preparation of a feedstock mixture by adding a complexing agent, selected from nitrogen-containing complexing agents, acetic acid and citric acid to the alumina feedstock and carrying out hydrothermal treatment, wherein the complexing agent can be used singly or wherein two or more complexing agents can be used in combination. The above captioned complexing agents, and in particular the nitrogen-containing complexing agents are well known in the art and are available at low costs. Their use is easy and does not require specific precaution since the nitrogen-containing complexing agents are in general non-toxic. The method is easily controllable and can be carried out in short process times so that the costs of the inventive method are low.

The pH of the feedstock mixture is preferably set to at least 8, more preferably to at least 9 and even more preferably to at least 10 whereby surprisingly the purity of the obtained aluminum monohydrate can be increased. In view of obtaining an extraordinary high purity of 99.99%, the pH of the feedstock mixture is in particular set to a range from 10 to 12, most preferably to a range from 10 to 11. The "pH of the feedstock mixture" as used herein refers to the pH of the feedstock before the hydrothermal treatment, i.e. before subjecting the feedstock mixture to the hydrothermal treatment.

In order to improve dissolution of the impurities and to facilitate the recrystallization of the alumina feedstock during hydrothermal treatment, the feedstock mixture preferably contains ammonia, wherein a weight ratio of alumina feedstock to ammonia is preferably from 100:1 to 10:1, in particular from 50:1 to 10:1. The ammonia can be used as aqueous solution. As an example, a 25 wt % aqueous solution of ammonia can be prepared and added to the feedstock mixture. Ammonia may preferably be used in an amount of 22 g pure ammonia relative to 100 g alumina feedstock.

It was further found surprisingly preferable that the feedstock mixture contains ammonia and the content of ammonia relative to the content of the alumina feedstock ranges from 1.25 wt % to 3.70 wt %.

Due to easy availability at low costs, the alumina feedstock is preferably selected from smelter grade alumina, chemical grade alumina, transition aluminas (i.e. λ-alumina, δ-alumina, η-alumina, Θ-alumina, κ-alumina, ρ-alumina and χ-alumina), and aluminum trihydrate. Of those, smelter grade alumina, chemical grade alumina, transition aluminas (i.e. λ-alumina, δ-alumina, η-alumina, Θ-alumina, κ-alumina, ρ-alumina and χ-alumina) and aluminum trihydrate, in particular smelter grade alumina or aluminum trihydrate, are especially preferred. It is particularly preferable in view of a reduction of the process time to use ground versions of the above-captioned feedstocks. Using these ground versions can also contribute to an improved purity level. Accordingly, after grinding, the D50 particle size of the ground versions of the above-captioned feedstocks preferably ranges from 0.1 μm to 100 μm and more preferably ranges from 1 μm to 45 μm. The term "alumina feedstock" is used herein to encompass the above-mentioned feedstock, including aluminum trihydrate. The term "alumina feedstock" is thus used herein as a synonym to "feedstock" or "feedstock for the preparation of aluminum monohydrate", in order to define any feedstock suitable for the preparation of aluminum monohydrate (and alpha alumina, upon calcination of the aluminum monohydrate).

Within the present invention, it was found that the use of particular complexing agents from the group of at least a nitrogen-containing complexing agent which preferably include at least one electron-donating nitrogen, in the method of preparing aluminum monohydrate as described herein, are highly advantageous.

Thus, the nitrogen-containing complexing agent is preferably ethylenediamine tetraacetic acid which has been surprisingly found to be of particular advantage within the method of preparing aluminum monohydrate (or alpha alumina) as described herein, having excellent high purity levels with only very low amounts of impurities such as Na (calculated as $Na_2O$), Fe (calculated as $Fe_2O_3$) and/or Ca (as CaO), even when starting from low purity starting materials (alumina feedstocks). Ethylenediamine tetraacetic acid appears to balance the acidic and alkaline properties of the feedstock mixture and surprisingly allows obtaining high purity aluminum monohydrate in a simple and straight forward method starting from low purity alumina feedstocks, as described herein. Although the disodium salt of the ethylenediamine tetraacetic acid is one of the most commonly used complexing agents, it was found that the pure ethylenediamine tetraacetic acid achieves better results, in particular at a pH of at least 8, preferably at least 9, and more preferably within a pH range of 10 to 12, most preferably 10 to 11, and does not increase the total $Na_2O$ concentration.

It was further found that the impurities could be best separated from the feedstock mixture when a weight ratio of the alumina feedstock to the complexing agent (in particular ethylenediamine tetraacetic acid), is from 50:1 to 20:1. Higher amounts of complexing agents did not achieve significant better results on the improvement of the impurity level of the aluminum monohydrate. However, the smaller the amount of complexing agent, the higher the impurity level. Using 20 to 30 g complexing agent relative to 1000 g alumina feedstock was found to be particularly preferable. As stated above, according to a preferred embodiment of the present invention, the complexing agent is ethylenediamine tetraacetic acid. According to one embodiment of the invention, the weight ratio of the alumina feedstock to the complexing agent (in particular ethylenediamine tetraacetic acid) is calculated based on the dry weight of the alumina feedstock used in the feedstock mixture (to be subjected to the hydrothermal treatment) and the dry weight of the complexing agent (in particular ethylenediamine tetraacetic acid) present in the feedstock mixture (i.e. preferably without taking into the ratio calculation any remaining moisture of the materials, which is commonly less than 1 wt %, e.g. about 0.5 wt % or less).

According to a further preferred embodiment, the feedstock mixture comprises ammonium hydroxide. Without being bound by the theory, it seems that the addition of ammonium hydroxide serves as a buffer in particular in combination with ammonia, so that the desired pH value can be maintained easily. Therefore, the impurities get dissolved to a high degree and the recrystallization of the alumina proceeds easily at high speed.

In order to balance/adjust the pH value of the feedstock mixture if required (in/to the range above 8 or above 9, and in particular within 10 to 11), the feedstock mixture may further comprise an acid, wherein the acid is particularly selected from the group consisting of hydrochloric acid, phosphoric acid, sulfuric acid, nitric acid, boric acid, hydrofluoric acid and carboxylic acids, wherein the carboxylic acid is preferably selected from carbonic acid, formic acid and propionic acid. It was surprisingly found that the addition of one of these acids or a mixture thereof contributes to a more efficient reduction of $Na_2O$ and CaO.

The feedstock mixture further preferably comprises hydrogen peroxide, sodium hydroxide or potassium hydroxide. Thereby, the pH value can be adjusted more easily.

In view of improving the purity of the aluminum monohydrate to be prepared, it is further advantageous when a weight ratio of the solid compounds of the feedstock mixture to the liquid compounds of the feedstock mixture ranges from 1:1 to 1:2.

It is further preferable in view of high purity of the aluminum monohydrate to be produced, to set the temperature during the hydrothermal treatment within a range from 150° C. to 260° C. Higher temperatures may also work, however, the higher the temperature is set, the more cost intensive is the method. The lower the temperature is set, the slower is the recrystallization. A temperature set within the range of 150° C. to 260° C. balances all advantageous effects and achieves good results in view of purity of the product.

The pressure during the hydrothermal treatment is not particularly limited and a maximum value will depend on the stability of the vessel used. However, good reaction speed and cost efficiency can be achieved when the hydrothermal pressure during the hydrothermal treatment ranges from 1 bar to 300 bar and in particular from 1 bar to 50 bar.

More preferably, the hydrothermal treatment is carried out for 1 to 100 hours.

The reaction during the hydrothermal treatment can preferably be accelerated by stirring the feedstock mixture during the hydrothermal treatment.

As a further aspect of the present invention, provided is a method of preparing alpha alumina, wherein the aluminum monohydrate, obtained according to the method described above is calcinated. The calcination can be carried out at a temperatures above 700° C., more specifically above 800° C., and most specifically between 90° and 1500° C. In addition, calcination can be done in an electric, gas or other-fired furnace/kiln (continuous or periodic), and the dwell/hold time is flexible. The calcination parameters are preferably set to adjust a specific crystal sizes and surface areas of the alpha alumina. Primary crystal sizes are preferably from 0.1 to 6 µm and specific surface areas from 0.1 to 50 $m^2$/g, depending on the desired product to be made, wherein the particle size distribution is measured in accordance with DIN EN 725/T5 and the surface area is measured in accordance with ISO 9227. Due to the use of the high purity aluminum monohydrate, also the alpha alumina shows high purity.

A further aspect of the present invention is directed to the use of ethylenediamine tetraacetic acid (EDTA) in the preparation of aluminum monohydrate, in particular in a hydrothermal treatment. A further aspect of the present invention is directed to the aforementioned use, wherein the aluminum monohydrate is obtained from a feedstock mixture which is subjected to a hydrothermal treatment, wherein the pH of the feedstock mixture before the hydrothermal treatment is at least 8, preferably at least 9, more preferably in the range from 10 to 12, most preferably in the range from 10 to 11, and the weight ratio of the feedstock to the ethylenediamine tetraacetic acid is from 50:1 to 20:1, optionally from 40:1 to 20:1.

As a further aspect of the present invention, the use of a combination of a complexing agent selected from nitrogen-containing complexing agents, acetic acid and citric acid, and ammonia in the preparation of aluminum monohydrate, such as boehmite and/or diaspore, in particular in a hydrothermal treatment is disclosed. The use of the specific complexing agent in combination with ammonia improves the purity of the aluminum monohydrate to be prepared.

The following embodiments of the invention are also disclosed herein:
1. Method of preparing aluminum monohydrate comprising the steps of:
   mixing alumina feedstock with a complexing agent, selected from nitrogen-containing complexing agents, acetic acid and citric acid, to obtain a feedstock mixture, and
   subjecting the feedstock mixture to a hydrothermal treatment.
2. The method of embodiment 1, wherein the pH of the feedstock mixture is at least 5, preferably at least 8, more preferably at least 9, even more preferably at least 10, and wherein the pH of the feedstock mixture most preferably ranges from 10 to 11.
3. The method of embodiment 1 or 2, wherein the feedstock mixture contains ammonia, wherein a weight ratio of the alumina feedstock to ammonia is from 100:1 to 10:1.
4. The method of any of the preceding embodiments, wherein the feedstock mixture contains ammonia, wherein the content of ammonia relative to the content of the alumina feedstock ranges from 1.25 wt % to 3.70 wt %.
5. The method of any of the preceding embodiments, wherein the alumina feedstock is selected from smelter grade alumina, pre-treated (leached) smelter grade alumina, chemical grade alumina, pre-treated (leached) chemical grade alumina, transition aluminas, and aluminum trihydrate.
6. The method of any of the preceding embodiments, wherein the nitrogen-containing complexing agent includes at least one electron-donating nitrogen, wherein the nitrogen-containing complexing agent is particularly selected from nitrilotriacetic acid, ethylenediamine tetraacetic acid, ethylenediamine tetraacetic acid di-sodium salt, 1,2-cyclohexylenediamine tetraacetic acid, di-ethylenetriamine pentaacetic acid, bis(aminoethyl)-glycolether-N,N,N'N'-tetraacetic acid, N-(2-hydroxyethyl)-ethylendiamine-N,N,N'-triacetic acid trisodium salt, triethylenetetramine hexaacetic acid, tetrasodium N,N-bis(carboxymethyl)-L-glutamate, L-glutamic acid, N—N-diacetic acid tetrasodium salt GLDA, ethylenediamine-N,N'-bis(2-hydroxyphenylacetic acid), ethylendiamine, 2-(2-aminoethylamino)etanol, diethylene triamine, diethylene tetramine, iminodiacetate, triethylene tetramine, triaminotriethylamine, bis(salicyliden)ethylenediamine, ethylendiamino triacetate, 1,4,7,10-tetraazacyclododecan-1,4,7,10-tetraacetate, dimethylglyoxime, 8-hydroxychinoline, 2,2'-bipyridine and 1,10-phenanthroline.
7. The method of any of the preceding embodiments, wherein the nitrogen-containing complexing agent is ethylenediamine tetraacetic acid.
8. The method of any of the preceding embodiments, wherein a weight ratio of the alumina feedstock to the nitrogen-containing complexing agent is from 50:1 to 20:1.
9. The method of any of the preceding embodiments, wherein the feedstock mixture further comprises ammonium hydroxide.
10. The method of any of the preceding embodiments, wherein the feedstock mixture further comprises an acid, wherein the acid is particularly selected from the group consisting of hydrochloric acid, phosphoric acid, sulfuric acid, nitric acid, boric acid, hydrofluoric acid and carboxylic acids, wherein the carboxylic acid is preferably selected from carbonic acid, formic acid and propionic acid.
11. The method of any of the preceding embodiments, wherein the feedstock mixture further comprises hydrogen peroxide, sodium hydroxide or potassium hydroxide.
12. The method of any of the preceding embodiments, wherein a weight ratio of the solid compounds of the feedstock mixture to the liquid compounds of the feedstock mixture ranges from 1:1 to 1:2 and/or wherein the temperature during the hydrothermal treatment ranges from 150° C. to 260° C. and/or wherein the hydrothermal pressure during the hydrothermal treatment ranges from 1 bar to 300 bar, in particular from 1 bar to 50 bar and/or wherein the hydrothermal treatment is carried out for 1 to 100 hours, and/or wherein the feedstock mixture is stirred during the hydrothermal treatment.
13. Method of preparing alpha alumina, comprising a step of calcinating the aluminum monohydrate, obtained according to the method of any one of embodiments 1 to 12.

14. The method of embodiment 13, wherein the purity level of the alpha alumina is from 99.8 wt. % to 99.99 wt. %
15. Use of a complexing agent, selected from nitrogen-containing complexing agents, acetic acid and citric acid, in the preparation of aluminum monohydrate, in particular in a hydrothermal treatment.

EXAMPLES

Example 1

In an autoclave 50 g aluminum hydroxide ($Al(OH)_3$) having an impurity ($Na_2O$, $Fe_2O_3$, $SiO_2$, MgO, $TiO_2$, CaO, $Li_2O$ and ZnO) concentration of about 0.25 wt % (see Table 1 for details) were mixed with 0.5 g EDTA (ethylenediamine tetraacetic acid), 1.5 ml pure $NH_3$ and 50 g H2O. Hydrothermal treatment was carried out under stirring at 190° C. and 12 bar water vapor pressure for 48 hours. High purity boehmite was obtained in an amount of 41.75 g after filtration of the reaction mixture, washing and drying of the filtrate.

The results regarding impurity reduction are shown in Table 1 below, wherein the $2^{nd}$ line shows the initial amount of each of the impurities. If not defined in another way, the values provided in Table 1 are given in wt %. In order to be able to compare the purity of the feedstock before treatment (e.g. smelter grade alumina or aluminum hydrate) with the aluminum monohydrate product, all purity values are reported on an $Al_2O_3$ basis.

TABLE 1

| Example No. | EDTA [g] | $NH_3$ [ml] | pH | $Na_2O$ | $Fe_2O_3$ | MgO | CaO | $Li_2O$ | ZnO |
|---|---|---|---|---|---|---|---|---|---|
| Feedstock before treatment | | | | 0.1835 | 0.0084 | 0.0008 | 0.0101 | 0.0234 | 0.0255 |
| 1 | 0.5 | 1.5 | 11 | 0.0199 | 0.0044 | 0.0003 | 0.0031 | 0.0044 | — |
| 2 | 1 | 3 | 11 | 0.0082 | 0.0022 | 0.0004 | 0.0014 | 0.0015 | 0.0051 |
| 3 | 1.2 | 3 | 10 | 0.0082 | 0.0020 | 0.0001 | 0.0013 | 0.0019 | 0.0042 |
| 4 | 1.5 | 2 | 8.5 | 0.0035 | 0.0025 | 0.0001 | 0.0024 | 0.0015 | 0.0067 |
| 5 | 1.5 | 3 | 9 | 0.0059 | 0.0019 | 0.0002 | 0.0012 | 0.0016 | 0.0041 |
| 6 | 1.5 | 3.5 | 9.5 | 0.0071 | 0.0020 | 0.0002 | 0.0012 | 0.0016 | 0.0052 |
| 7 | 1.5 | 4 | 10 | 0.0059 | 0.0016 | 0.0001 | 0.0011 | 0.0020 | 0.0051 |
| 8 | 1.5 | 4.5 | 10.5 | 0.0035 | 0.0016 | 0.0002 | 0.0007 | 0.0014 | 0.0042 |
| 9 | 1.5 | 6 | 11 | 0.0059 | 0.0013 | 0.0002 | 0.0007 | 0.0018 | 0.0038 |
| 10 | 1.5 | 10 | 11 | 0.0094 | 0.0013 | 0.0002 | 0.0011 | 0.0024 | 0.0036 |

It can be seen that for impurities $Na_2O$, $Fe_2O_3$, MgO, CaO and $Li_2O$ a significant reduction of the impurity level has been achieved.

Examples 2 to 10

Examples 2 to 10 are prepared in the same manner as Example 1, with the exception that the amounts of EDTA and $NH_3$ have been adjusted as shown in Table 1 above. It can be seen that for impurities $Na_2O$, $Fe_2O_3$, MgO, CaO, $Li_2O$ and ZnO a significant reduction of the impurity level has been achieved.

From Table 1 above, it can further be seen that an increase in the ammonia content from 6 to 10 ml (see Examples 9 and 10), did not lead to a further improvement, i.e. a further reduction of the impurities, but instead lead to a slight increase of some of the impurities ($Na_2O$, CaO, $Li_2O$).

Figure 1:
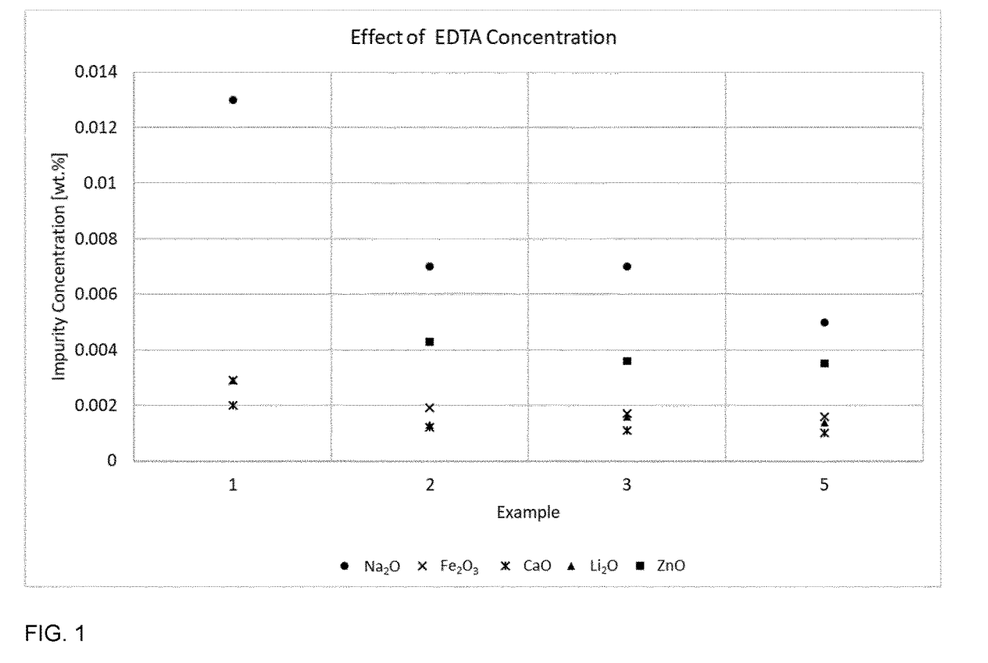
FIG. 1 is a diagram showing the impurity levels ($Na_2O$, $Fe_2O_3$, CaO, $Li_2O$, and ZnO) of Examples 1, 2, 3, and 5.

In FIG. 1 the test results regarding the impurity level of Examples 1, 2, 3 and 5 are compared, thus giving an overview of the influence of the amount of EDTA. Example 1 has the lowest EDTA content (0.5 g EDTA per 50 g alumina feedstock—$Al(OH)_3$):weight ratio alumina feedstock:EDTA=100:1). Example 2 contains 1 g EDTA per 50 g alumina feedstock which corresponds to a weight ratio alumina feedstock:EDTA of 50:1. Example 3 contains 1.2 g EDTA per 50 g alumina feedstock which corresponds to a weight ratio alumina feedstock:EDTA of 42.7:1. Example 5 contains 1.5 g EDTA per 50 g alumina feedstock which corresponds to a weight ratio alumina feedstock:EDTA of 33.3:1. It can be seen that a weight ratio of the alumina feedstock to the nitrogen-containing complexing agent which ranges from 50:1 to 20:1 obtains the best test results. Higher amounts of EDTA significantly increase the costs while the impurity level does not further decrease significantly.

Figure 2:
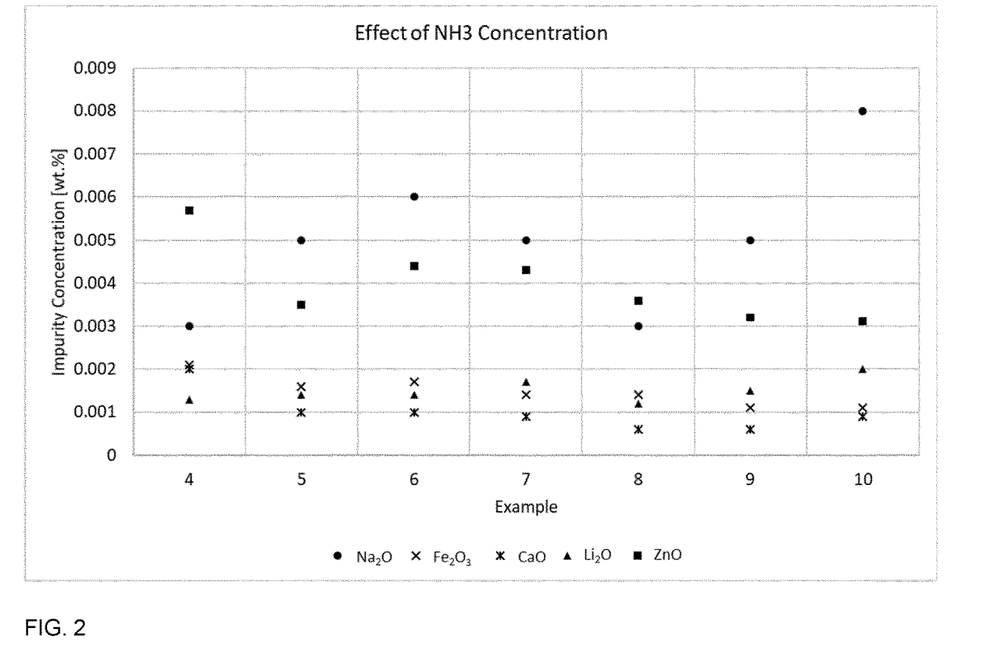
FIG. 2 is a diagram showing the impurity levels ($Na_2O$, $Fe_2O_3$, CaO, $Li_2O$, and ZnO) of Examples 4 to 10.

In FIG. 2 the test results regarding the impurity level of Examples 4 to 10 are compared, thus giving an overview of the influence of the amount of $NH_3$. Example 4 has the lowest ammonia content (2 ml ammonia corresponding to 1.5 g ammonia:weight ratio alumina feedstock:ammonia=32.4:1). Example 5 contains 3 ml ammonia corresponding to 2.3 g ammonia:weight ratio alumina feedstock:ammonia=21.6:1. Example 6 contains 3.5 ml ammonia corresponding to 2.7 g ammonia:weight ratio alumina feedstock:ammonia=18.5:1. Example 7 contains 4 ml ammonia corresponding to 3.1 g ammonia:weight ratio alumina feedstock:ammonia=16.2:1. Example 8 contains 4.5 ml ammonia corresponding to 3.5 g ammonia:weight ratio alumina feedstock:ammonia=14.4:1. Example 9 contains 6 ml ammonia corresponding to 4.6 g ammonia:weight ratio alumina feedstock:ammonia=10.8:1. Example 10 contains 6 ml ammonia corresponding to 7.7 g ammonia:weight ratio alumina feedstock:ammonia=6.5:1.

It can be seen that a weight ratio of the alumina feedstock to ammonia ranging from 100:1 to 10:1 obtains excellent impurity reduction. Higher amounts of ammonia do not further influence the impurity level significantly.

Example 11

Example 11 was prepared in the same manner as Example 1 using aluminum trihydrate as a starting material having a D50 of 8 μm. The aluminum trihydrate was mixed with 1.1 g EDTA and 4.5 ml $NH_3$. Hydrothermal treatment was carried out under stirring at 190° C. and 12 bar water vapor pressure for 24 hours. High purity boehmite was obtained which was filtered, washed and dried.

The results regarding impurity reduction are shown in Table 2 below, wherein the 2$^{nd}$ line shows the initial amount of each of the impurities and the last line shows the results of the impurity measurement after hydrothermal treatment. If not defined in another way, the values provided in Table 2 are given in wt %. In order to be able to compare the purity of the feedstock before treatment (e.g. smelter grade alumina or aluminum hydrate) with the aluminum monohydrate product, all purity values are reported on an $Al_2O_3$ basis.

TABLE 2

|  | pH | $Na_2O$ (%) | $Fe_2O_3$ (%) | MgO (%) | CaO (%) | $Li_2O$ (%) | ZnO (%) | CuO (%) | $Ga_2O_3$ (%) | BeO (%) |
|---|---|---|---|---|---|---|---|---|---|---|
| Feedstock before treatment | — | 0.122 | 0.0098 | 0.0003 | 0.0099 | 0.0092 | 0.0170 | 0.0064 | 0.0096 | 0.0014 |
| After hydrothermal treatment | 11 | 0.002 | 0.0021 | 0.0002 | 0.0007 | 0.0006 | 0.0010 | 0.0017 | 0.0062 | 0.0010 |

It can be seen that for impurities $Na_2O$, $Fe_2O_3$, MgO, CaO, $Li_2O$, ZnO, CuO, $Ga_2O$ and BeO a significant reduction of the impurity level has been achieved.

Example 12

Example 12 was prepared in the same manner as Example 1 using smelter grade alumina (SGA) feedstock having a particle size of 84 μm and having a particle size of 5 μm as a starting material. The smelter grade alumina was mixed with 1.5 g EDTA and 6 ml $NH_3$. Hydrothermal treatment was carried out under stirring at 190° C. and 12 bar water vapor pressure for 60 hours. High purity boehmite was obtained which was filtered, washed and dried.

The results regarding impurity reduction are shown in Table 3 below. If not defined in another way, the values provided in Table 3 are given in wt %. In order to be able to compare the purity of the feedstock before treatment (e.g. smelter grade alumina or aluminum hydrate) with the aluminum monohydrate product, all purity values are reported on an $Al_2O_3$ basis.

TABLE 3

|  | pH | $Na_2O$ (%) | $Fe_2O_3$ (%) | MgO (%) | CaO (%) |
|---|---|---|---|---|---|
| before treatment: SGA 84 μm | — | 0.133 | 0.0176 | 0.0069 | 0.0216 |
| After hydrothermal treatment: SGA 84 μm | 11 | 0.025 | 0.0060 | 0.0040 | 0.0051 |
| before treatment: SGA 5 μm | — | 0.488 | 0.0208 | 0.0003 | 0.0294 |
| After hydrothermal treatment: SGA 5 μm autoclaved | 11 | 0.006 | 0.0044 | 0.0008 | 0.0010 |

It can be seen that for impurities $Na_2O$, $Fe_2O_3$, MgO and CaO a significant reduction of the impurity level has been achieved.

Example 13

Example 13 was prepared in the same manner as Example 12 using smelter grade alumina (SGA) feedstock. Sample A was not leached. Sample B has been leached with HCl/water mixture. EDTA has been added in an amount of 1.5 g and $NH_3$ has been added in an amount of 6 ml to non-leached smelter grade alumina sample A and leached smelter grade alumina sample B. Hydrothermal treatment was carried out under stirring at 190° C. and 12 bar water vapor pressure for 48 hours. The obtained boehmite was filtered, washed and dried.

The results regarding impurity reduction are shown in Table 4 below. If not defined in another way, the values provided in Table 4 are given in wt %. In order to be able to compare the purity of the feedstock before treatment (e.g. smelter grade alumina or aluminum hydrate) with the aluminum monohydrate product, all purity values are reported on an $Al_2O_3$ basis.

Example 14

Example 14 was prepared in the same manner as Example 13 using the same smelter grade alumina (SGA) feedstock. Sample C was not leached. Sample D has been leached with HCl/water mixture. EDTA has not been added but $NH_3$ has been added in an amount of 6 ml to non-leached smelter grade alumina sample C and leaches smelter grade alumina sample D. Hydrothermal treatment was carried out under stirring at 190° C. and 12 bar water vapor pressure for 48 hours. The obtained boehmite was filtered, washed and dried.

The results regarding impurity reduction are shown in Table 4 below. If not defined in another way, the values provided in Table 4 are given in wt %. In order to be able to compare the purity of the feedstock before treatment (e.g. smelter grade alumina or aluminum hydrate) with the aluminum monohydrate product, all purity values are reported on an $Al_2O_3$ basis.

Example 15

Example 15 was prepared in the same manner as Example 13 using the same smelter grade alumina (SGA) feedstock. Sample E was not leached. Sample F has been leached with HCl/water mixture. EDTA has been added in an amount of 1.5 g but $NH_3$ has not been added. Hydrothermal treatment was carried out under stirring at 190° C. and 12 bar water vapor pressure for 48 hours. The obtained boehmite was filtered, washed and dried.

The results regarding impurity reduction are shown in Table 4 below. If not defined in another way, the values provided in Table 4 are given in wt %. In order to be able to compare the purity of the feedstock before treatment (e.g. smelter grade alumina or aluminum hydrate) with the aluminum monohydrate product, all purity values are reported on an $Al_2O_3$ basis.

TABLE 4

| SGA | leached | D50 [μm] | temp [° C.] | Time [h] | EDTA [g] | NH₃ [ml] | Na₂O | Fe₂O₃ | CaO |
|---|---|---|---|---|---|---|---|---|---|
| before treatment | no | 84 | | | | | 0.319 | 0.0136 | 0.0192 |
| Sample A | no | 6 | 190 | 48 | 1.5 | 6 | 0.006 | 0.0044 | 0.0007 |
| Sample B | yes | 6 | 190 | 48 | 1.5 | 6 | 0.002 | 0.0051 | 0.0011 |
| Sample C | no | 6 | 190 | 48 | 0 | 6 | 0.034 | 0.0160 | 0.0218 |
| Sample D | yes | 6 | 190 | 48 | 0 | 6 | 0.007 | 0.0181 | 0.0215 |
| Sample E | no | 6 | 190 | 48 | 1.5 | 0 | 0.022 | 0.0120 | 0.0111 |
| Sample F | yes | 6 | 190 | 48 | 1.5 | 0 | 0.032 | 0.0187 | 0.0085 |

As can be seen from the test results in Table 4, the addition of EDTA and NH₃ (samples A and B) provides the best test results in view of a reduction of the impurities. However, the addition of EDTA only (samples E and F) also provides good reduction of the impurities captioned in Table 4. Merely the impurity level of Fe2O3 of sample F is slightly increased. However, the impurity levels of Na₂O and CaO are significantly reduced. Although the addition of NH₃ (see samples C and D) results in a reduction of Na₂O, the impurity levels of Fe2O3 and CaO are high.

Example 16

Example 16 shows test results of a soda impurity level of samples G to V of smelter grade alumina feedstock to which EDTA has been added in an amount of 1.5 g and NH₃ has been added in an amount of 6 ml. Hydrothermal treatment was carried out without stirring at 190° C. and 12 bar water vapor pressure. The obtained boehmite was filtered, washed and dried. Samples G to V have thus been treated at the same temperature but for a different period of time. In addition, the D50 of the smelter grade alumina feedstock samples G to V varied as outlined in Table 5 below.

TABLE 5

| Sample | d50 [μm] | Soda [wt. %] (before HT) | Soda [wt. %] (after HT) | time [h] | temp. [° C.] | pressure [bar] | pH |
|---|---|---|---|---|---|---|---|
| G | 2 | 0.334 | 0.045 | 6 | 190 | 12 | 11 |
| H | 5 | 0.087 | 0.027 | 6 | 190 | 12 | 11 |
| I | 84 | 0.087 | 0.051 | 6 | 190 | 12 | 11 |
| J | 5 | 0.087 | 0.025 | 12 | 190 | 12 | 11 |
| K | 84 | 0.087 | 0.045 | 12 | 190 | 12 | 11 |
| L | 2 | 0.334 | 0.015 | 18 | 190 | 12 | 11 |
| M | 5 | 0.087 | 0.009 | 18 | 190 | 12 | 11 |
| N | 5 | 0.087 | 0.009 | 24 | 190 | 12 | 11 |
| O | 84 | 0.087 | 0.036 | 24 | 190 | 12 | 11 |
| P | 5 | 0.087 | 0.002 | 48 | 190 | 12 | 11 |
| Q | 9 | 0.087 | 0.006 | 48 | 190 | 12 | 11 |
| R | 15 | 0.087 | 0.008 | 48 | 190 | 12 | 11 |
| S | 68 | 0.087 | 0.018 | 48 | 190 | 12 | 11 |
| T | 84 | 0.087 | 0.028 | 48 | 190 | 12 | 11 |
| U | 5 | 0.087 | 0.002 | 60 | 190 | 12 | 11 |
| V | 84 | 0.087 | 0.026 | 60 | 190 | 12 | 11 |

From Table 5 it can be seen that the addition of EDTA and NH₃ had advantageous effects on the reduction of the soda impurity level. It can also be seen that the higher the D50, the lower the reduction of the soda impurity level was. Particular improvements in the soda reduction could be obtained for a D50 ranging from 2 to 15 μm. It can also be followed from the test results of Table 5 that hydrothermal treatment for 18 to 48 resulted in excellent reduction of the soda impurity level, which a treatment period of 60 hours showed no further advantageous effects.

Example 17

Example 17 was prepared in the same manner as Example 1 using smelter grade alumina (SGA) feedstock having a particle size of 4.5 μm ($D_{50}$) as a starting material. 50 g of smelter grade alumina was mixed with 100 ml of water and different amounts of EDTA and NH₃ as shown in Table 6. Hydrothermal treatment was carried out under stirring at 190° C. and 12 bar water vapor pressure for 48 hours. High purity boehmite was obtained which was filtered, washed and dried.

The results regarding impurity reduction are shown in Table 6 below. If not defined in another way, the values provided in Table 6 are given in wt %. In order to be able to compare the purity of the feedstock before treatment (e.g. smelter grade alumina or aluminum hydrate) with the aluminum monohydrate product, all purity values are reported on an Al₂O₃ basis.

TABLE 6

| Sample | EDTA [g] | NH₃ [ml] | pH before Hydorthermal Treatment | pH after Hydorthermal Treatment | Na₂O (%) | Fe₂O₃ (%) | CaO (%) |
|---|---|---|---|---|---|---|---|
| SGA Feed | — | — | — | — | 0.3300 | 0.0165 | 0.0218 |
| 17/1 | 1.5 | 0.1 | 7.0 | 5.9 | 0.0188 | 0.0082 | 0.0071 |
| 17/2 | 1.5 | 1 | 9.1 | 8.6 | 0.0118 | 0.0047 | 0.0013 |
| 17/3 | 1.5 | 6 | 10.4 | 10.3 | 0.0094 | 0.0047 | 0.0014 |
| 17/4 | 0.5 | 6 | 10.8 | 10.7 | 0.0224 | 0.0138 | 0.0021 |

Example 18

Example 18 was prepared in the same manner as Example 1 using aluminum hydrate feedstock having a particle size of 8 μm as a starting material. 50 g of aluminum hydrate was mixed with 100 ml of water and different amounts of EDTA and NH₃ as shown in Table 7. Hydrothermal treatment was carried out under stirring at 190° C. and 12 bar water vapor pressure for 24 hours. High purity boehmite was obtained which was filtered, washed and dried.

The results regarding impurity reduction are shown in Table 7 below. If not defined in another way, the values provided in Table 7 are given in wt %. In order to be able to compare the purity of the feedstock before treatment (e.g. smelter grade alumina or aluminum hydrate) with the aluminum monohydrate product, all purity values are reported on an Al₂O₃ basis.

TABLE 7

| Sample | EDTA [g] | NH₃ [ml] | pH before hydorthermal treatment | pH after hydorthermal treatment | Na₂O (%) | Fe₂O₃ (%) | CaO (%) |
|---|---|---|---|---|---|---|---|
| Aluminum Hydrate Feed | — | — | — | — | 0.2647 | 0.0093 | 0.0034 |
| 18/1 | 1.5 | 0.1 | 3.4 | 5.3 | 0.0612 | 0.0079 | 0.0013 |
| 18/2 | 1.5 | 0.5 | 6.1 | 6.2 | 0.0129 | 0.0077 | 0.0009 |
| 18/3 | 1.5 | 1 | 9.1 | 9.2 | 0.0082 | 0.0048 | 0.0006 |
| 18/4 | 1.5 | 6 | 10.3 | 10.1 | 0.0082 | 0.0041 | 0.0006 |

The importance of the pH of the feedstock mixture (i.e. measured before the hydrothermal treatment) for purification of the material can be seen Tables 6 and 7 for SGA and aluminum hydrate, respectively. While mixtures with low pHs of 8 or lower show some degree of purification, pHs of at least 8, preferably at least 9 are necessary to achieve an effective reduction of critical impurities, particularly Na₂O, Fe₂O₃, and CaO. Furthermore, Table 6 shows the effect of the presence of different amounts of the complexing agent. An optimum reduction of all impurities to preferred levels (i.e. for this example <0.010% Na₂O, <0.005% Fe₂O₃ and <0.0015% CaO) is only observed for EDTA additions of 1.5 g, corresponding to a range within 50:1 to 20:1 for the weight ratio of (alumina) feedstock to EDTA, optionally from 40:1 to 20:1.

Figure 3:
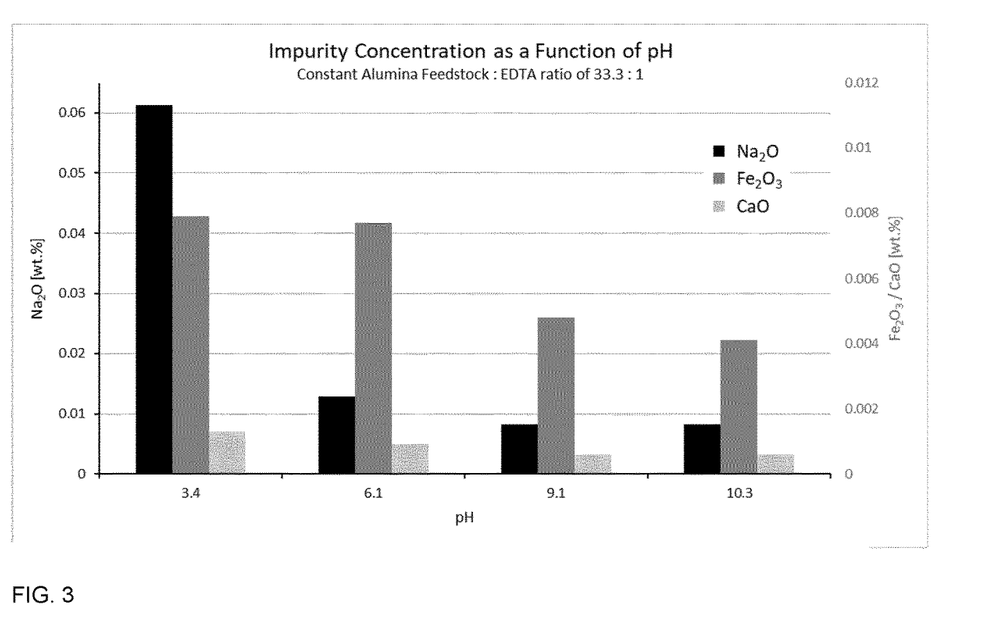

The dependence of the impurity concentration as a function of the pH is shown graphically in FIG. 3 for Samples 18/1 to 18/4 of Table 7 above. For the Fe₂O₃ and CaO impurities, due to the lower overall concentrations, a different scale is used (right hand side of the figure). The highly advantageous effect of a pH of above 8 for a feedstock mixture containing EDTA can be readily seen from FIG. 3.

The effect of different amounts of EDTA was further tested in the additional experiments/samples for the effect on the Na₂O impurity level, as shown in Table 8 below. Thus, the amount of EDTA was only 0.5 g in Sample 18/5 and only 1 g in Sample 18/6. This resulted in an inferior reduction of the Na₂O impurity level, as seen from the comparison to Sample 18/4 having 1.5 g EDTA.

TABLE 8

| Sample | EDTA [g] | NH₃ [ml] | pH before hydorthermal treatment | pH after hydorthermal treatment | Na₂O (%) |
|---|---|---|---|---|---|
| Aluminum Hydrate Feed | — | — | — | — | 0.2647 |
| 18/5 | 0.5 | 6 | 10.8 | 10.6 | 0.0247 |
| 18/6 | 1 | 6 | 10.5 | 10.4 | 0.0129 |
| 18/4 | 1.5 | 6 | 10.3 | 10.1 | 0.0082 |

The invention claimed is:

1. A method of preparing aluminum monohydrate comprising the steps of:
   mixing an alumina feedstock with ethylenediamine tetraacetic acid, to obtain a feedstock mixture, and
   subjecting the feedstock mixture to a hydrothermal treatment,
   wherein the pH of the feedstock mixture is at least 8,
   wherein the feedstock mixture comprises ammonia, and wherein the content of ammonia relative to the content of the alumina feedstock ranges from 1.25 wt % to 3.70 wt %.

2. The method of claim 1, wherein the alumina feedstock is selected from smelter grade alumina, pre-treated smelter grade alumina, chemical grade alumina, pre-treated chemical grade alumina, transition aluminas, and aluminum trihydrate.

3. The method of claim 1, wherein a weight ratio of the alumina feedstock to the ethylenediamine tetraacetic acid is from 50:1 to 20:1.

4. The method of claim 1, wherein the feedstock mixture further comprises hydrogen peroxide, sodium hydroxide or potassium hydroxide.

5. The method of claim 1, wherein a weight ratio of the solid compounds of the feedstock mixture to the liquid compounds of the feedstock mixture ranges from 1:1 to 1:2.

6. The method of claim 1, wherein the temperature during the hydrothermal treatment is 150° C. to 260° C.

7. The method of claim 1, wherein the hydrothermal pressure during the hydrothermal treatment ranges from 1 bar to 300 bar.

8. The method of claim 1, wherein the feedstock mixture is stirred during the hydrothermal treatment.

9. The method of claim 1, wherein the pH of the feedstock mixture is at least 9.

10. The method of claim 9, wherein the alumina feedstock is selected from smelter grade alumina, pre-treated smelter grade alumina, chemical grade alumina, pre-treated chemical grade alumina, transition aluminas, and aluminum trihydrate.

11. The method of claim 9, wherein a weight ratio of the alumina feedstock to the ethylenediamine tetraacetic acid is from 50:1 to 20:1.

12. A method of preparing aluminum monohydrate comprising the steps of:
   mixing an alumina feedstock with ethylenediamine tetraacetic acid, to obtain a feedstock mixture, and
   subjecting the feedstock mixture to a hydrothermal treatment,
   wherein the pH of the feedstock mixture is at least 8,
   wherein the feedstock mixture comprises ammonia, and wherein a weight ratio of the alumina feedstock to ammonia is from 100:1 to 10:1.

13. The method of claim 12, wherein the content of ammonia relative to the content of the alumina feedstock ranges from 1.25 wt % to 3.70 wt %.

14. The method of claim 12, wherein the alumina feedstock is selected from smelter grade alumina, pre-treated smelter grade alumina, chemical grade alumina, pre-treated chemical grade alumina, transition aluminas, and aluminum trihydrate.

15. A method of preparing aluminum monohydrate comprising the steps of:
   mixing an alumina feedstock with ethylenediamine tetraacetic acid, to obtain a feedstock mixture, and
   subjecting the feedstock mixture to a hydrothermal treatment,
   wherein the pH of the feedstock mixture is at least 8,
   wherein the feedstock mixture further comprises ammonium hydroxide.

16. A method of preparing alpha alumina, the method comprising:
   mixing an alumina feedstock with ethylenediamine tetraacetic acid, to obtain a feedstock mixture, and
   subjecting the feedstock mixture to a hydrothermal treatment, wherein the pH of the feedstock mixture is at least 8, thereby preparing aluminum monohydrate,
and then calcinating the aluminum monohydrate to obtain alpha alumina.

17. The method of claim 16, wherein the purity level of the aluminum monohydrate is from 99.9 wt. % to 99.99 wt. %.

18. A method of preparing alpha alumina, the method comprising using ethylenediamine tetraacetic acid in a hydrothermal treatment to prepare the alpha alumina.

19. The method according to claim 18, wherein the alpha alumina is obtained from a feedstock mixture which is subjected to the hydrothermal treatment, wherein the pH of the feedstock mixture before the hydrothermal treatment is at least 8 and the weight ratio of the feedstock to the ethylenediamine tetraacetic acid is from 50:1 to 20:1.

* * * * *